W. WIEGAND.
EVAPORATING APPARATUS.
APPLICATION FILED MAR. 25, 1912.
1,145,728.
Patented July 6, 1915.
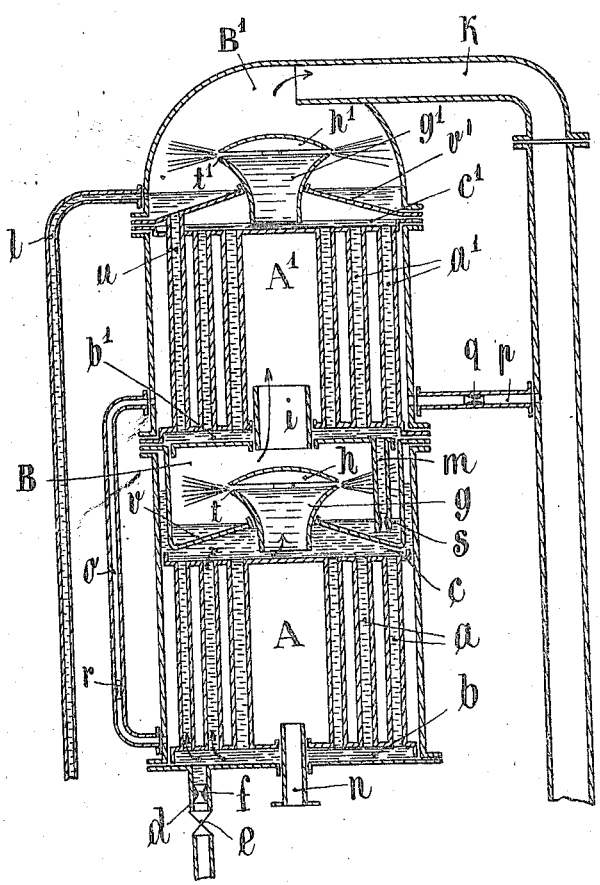
Witnesses
J. R. Pierce
L. O. Hilton
Inventor:
Wilhelm Wiegand.
by H. B. Willson & Co.
Attorneys

UNITED STATES PATENT OFFICE.

WILHELM WIEGAND, OF MERSEBURG, GERMANY.

EVAPORATING APPARATUS.

1,145,728.   Specification of Letters Patent.   Patented July 6, 1915.

Application filed March 25, 1912. Serial No. 686,061.

*To all whom it may concern:*

Be it known that I, WILHELM WIEGAND, engineer, citizen of Germany, subject of the King of Prussia and Emperor of Germany, residing at Merseburg, in the Kingdom of Prussia and Empire of Germany, have invented new and useful Improvements in Evaporating Apparatus, of which the following is a specification.

This invention relates to evaporators having vertical heating tubes and a separate chamber which at its bottom part is in communication with the discharge pipe for the liquid and which at its top part communicates with the discharge pipe for the separated steam, but in the present invention the liquid to be evaporated or concentrated is continuously passed through the apparatus.

In this invention an apparatus is provided having a number of evaporating elements one above the other, with vertical heating tubes in each element through all of which the liquid to be evaporated or concentrated is passed continuously upward in the same direction as the heating steam and partly evaporated therein. Chambers are arranged between the evaporating elements, which chambers are separate from the liquid spaces of said elements and receive the mixture of liquid and vapors formed within the heating tube of a lower evaporating element and separate the liquid from its vapors generated in the said heating tubes. Each separating chamber except the highest is at almost the same pressure as the liquid space of the evaporating element below same, and communicates with the liquid space of the higher evaporating element and also, by means of a direct communication at its top part, with the heating space of said higher element. The highest separating chamber is at its top and bottom part in communication with the condenser and collecting vessel respectively. The discharge opening of the liquid space of an evaporating compartment into the separating space is at a higher level than the inlet opening of the conduit connecting said separating chamber with the discharge pipe leading to the liquid collecting vessel or to the liquid space of the following evaporating compartment. The discharge opening of the liquid space of the evaporating compartment is preferably in the form of an annular gap or slit and is laterally below the outlet of the steam from the separating chamber while the communication between each separating chamber and the liquid space of the higher evaporating element is preferably in the form of a depending tube or tubes. In the use of such an evaporator it may be observed that in the case of watery liquid substances and in the case of low degrees of concentration the walls of the heating tubes, in spite of the relatively small quantity of liquid introduced through the inlet valve, are moistened in all the evaporating elements throughout their whole length and therefore are effective on their whole surface. The moistening of the entire tube surface depends upon the liquid, so far as this consists of a watery liquid substance, being carried along upward by the steam which develops in the lower parts of the heating tubes and adhering in thin layers to the upper parts of the tube walls. In the case of high degrees of concentration and in the case of viscid substances (such as glue) on the other hand the upper parts of the heating tubes, especially in the upper heating element or elements are not sufficiently moistened by the liquid which rises in them because the viscous liquid does not distribute itself evenly on the tube wall. The upper parts of the tubes therefore do not assist the evaporation but remain ineffective. It might be supposed that it would suffice to adjust the inlet valve of the liquid to introduce more liquid into the heating tubes, but by this means the degree of concentration would be affected and the liquid would not flow off in the desired state of concentration. It is equally impossible to reduce the number of tubes as by this means the effective heating surface, which has already become partially ineffective owing to the reason set forth, would be still further reduced.

In accordance with the invention the defect mentioned above is obviated without influencing the degree of concentration by the steam separating space especially in the upper evaporating element or elements being connected by means of a tube of very small cross section in proportion to the total heating tube section, with the liquid space in the same evaporating element, in order by means of a slight and limited circulation to increase the quantity of liquid rising through the heating tubes and thus insure a more complete moistening of the tube walls.

In the drawing by way of example a vacuum evaporator of double effect is shown in vertical section having two compartments arranged one above the other.

Each of the two evaporating compartments or elements consists of a heating chamber A or $A^1$ and a separating space B or $B^1$ in which the separation of the steam from the liquid takes place. In the heating spaces A and $A^1$ a series of vertical tubes $a$ and $a^1$ are provided which at their lower ends are connected with chambers $b$ or $b^1$, and at their upper ends with chambers $c$ or $c^1$ respectively. The liquid to be evaporated or concentrated is supplied into the lower chamber $b$ by a supply pipe $d$ provided with a closing valve $e$ and a throttle $f$. In the operation of the apparatus the liquid rises in the tubes $a$ and passes into the upper space or chamber $c$. This space communicates by a tube $g$ preferably in the form of a funnel and covered by a cap $h$, with the separating space B. Between the funnel tube $g$ and the cap $h$ there is left a small circular gap or slit $t$, through which the liquid may issue in the form of a veil. The separating space B is in free communication with the second heating chamber $A^1$ by means of a tube $i$. The upper chamber $c^1$, is, in a similar manner as the lower chamber, provided with a funnel shaped outlet tube $g^1$ and a cap $h^1$, with a slit $t^1$ left free between them. The adjacent separating space $B^1$ is at its upper part in communication with the condenser of the apparatus (not shown) by means of a pipe $k$, while the lower part of the space $B^1$ is provided with a discharge pipe $l$ leading to the collecting vessel (not shown). The communication of the liquid space or chamber $b^1$ of the second evaporating element with the separating chamber B is effected by a tube $m$, which extends almost to the bottom of the chamber B, which in its lower portion forms a collecting space for the liquid separated from the steam or vapor. The steam for heating is supplied through the pipe $n$ opening into the lower heating space A. This heating space is connected with the upper heating space $A^1$ by means of a pipe $o$ the lower opening of which is arranged near the bottom of the respective heating chamber. The upper heating chamber $A^1$ is further connected with the pipe $k$, leading to the condenser by means of a tube $p$. The tubes $p$, $o$, $m$ and $d$, are provided with narrowing or throttling pieces $q$, $r$, $s$, and $f$, the dimensions of which are predetermined with a view to corresponding with the desired conditions. The upper evaporating element $A^1$ is provided with a circulation tube $u$ which connects the separating space $B^1$ with the liquid space $b^1$ for the purpose of producing a limited circulation. The walls $v$ and $v^1$ which divide the separating space from the heated liquid space are arranged as closely as possible over the heating space in order to facilitate the particles of liquid carried along by the steam in the space $c$ or $c^1$ to pass into the separating space.

The operation of the apparatus is as follows: The liquid to be evaporated or concentrated is supplied to the inlet pipe $d$, while the evaporated or concentrated liquid is drawn off through the tube $l$ by any suitable means. The passage of the liquid through the evaporating compartments of the apparatus is preferably effected by means of the reduced pressure or partial vacuum prevailing in the condenser. As the condenser is in free connection with the upper separating chamber $B^1$ by means of the large bore tube $k$ approximately the same pressure to that in the condenser prevails in this chamber $B^1$, for example 0.075 atmospheres. Thus the liquid in the upper evaporating element is subjected to a similar pressure. Under these conditions of pressure, the liquid passing through the heating tubes evaporates at a temperature of about 40° C. Assuming a definite drop in temperature between the tubes $a$ and the heating chamber surrounding them, which drop depends upon the velocity of the passing liquid and the conditions of heat transference in the heating tubes, etc., then to the said temperature of about 40° C. there corresponds a definite temperature in the heating space $A^1$ and in the separating space B as well as in the heating tube system $a$, which is in communication with them both. Under the conditions mentioned above for example, this temperature amounts to 70° C. and corresponds to a steam pressure of 0.32 atmospheres in these spaces. Into the lower heating chamber the heating steam is supplied under a pressure corresponding to a temperature of 100° C. there being in this heating chamber the same drop in temperature available as in the upper chamber, viz. 30° C. Owing to the difference in pressures, which is permanently maintained during the operation between the separating spaces $B^1$ and B as well as between the latter and the container for the liquid to be evaporated or concentrated, the liquid is continuously passed from below upward through the apparatus. By suitably determining the section of passage through the narrowing or throttling pieces $f$ and $s$, the velocity of the passing liquid may be controlled and adapted to the other conditions (drop in temperature or pressure, etc.). The passage of the liquid through the heating tubes is assisted by the evaporation of the liquid which arises here by reason of the absorption of heat from the surrounding heating space. The liquid is entrained by and mixed with the resulting steam which passes out with great velocity through the circular slot $t$ in the form of a veil into the separating space B where it is projected with great force against the walls so that the separation of the liquid from the steam takes place. The latter passes up into the heating space $A^1$ and is here further utilized for heating the tubes $a^1$ while the liquid collects at the bottom of the space B and from here is forced through the tube $m$ into the upper heating compartment where the same operations take place. From the upper separating space $B^1$ the steam is drawn through the tube $k$ into the condenser while the concentrated liquid is drawn off from the bottom part of the separating chamber $B^1$ through the tube $l$ in any suitable manner, for instance, by means of a suction pump, a barometric discharge tube or the like.

The limited circulation produced by the tube $u$ comes into action as follows: When the evaporator is started first of all the liquid which reaches the steam separating space $B^1$ flows to the circulation tube $u$ which opens into the lowest part of this space and descends through this again into the liquid space below $b^1$. The liquid then rises again mixed with the freshly arriving liquid into the heating tubes $a^1$ and increases therefore the quantity of liquid rising in these tubes $a^1$. As soon as the circulation tube $u$ is no longer able to take up all the liquid which collects in the separating space $B^1$, this liquid collects in the separating space and rises to such a height that it is able to flow off by the outlet pipe $l$. Accordingly while in continuous working the greater part of the liquid passes off from the separating space $B^1$ through the outlet pipe $l$ but a smaller portion of the liquid returns to the liquid space $b^1$ of the evaporator.

It is advisable to insulate the circulation tube $u$ against the heating steam for example by means of an air stratum in order that the heating steam may not act on the liquid contained in the tube $u$ to the same extent that it does on the heating tubes $a^1$. The tube preferably has a section which amounts to approximately 5% of the total section of all heating tubes $a^1$. In the case of this limited circulation no noticeable falling off from the high standard of efficiency attained by means of the main tubes is observable. The fact should be emphasized that in general it is only in the upper evaporator or evaporators $A^1$ that the arrangement of the tube $u$ mentioned is necessary. In the case of very viscous substances all the evaporating elements may be provided with it.

The steam passed into the heating spaces A and $A^1$ is condensed for the most part on the heating tubes and the condensation water formed, as well as the air contained in the steam, may be discharged in any suitable manner. In the constructional form shown in the drawing, this is effected automatically without employment of special pumping arrangements. To this end the communication pipes $o$ and $p$ are provided which preferably have their openings near the bottom in the respective heating chambers. As soon as the condensation water collecting on the bottom of the chamber A reaches the opening of the tube $o$, it is forced through the latter into the upper heating chamber $A^1$ the air separated from the heating steam being at the same time passed off along with it. The condensation water thus removed from the chamber A unites with that formed in the chamber $A^1$ and as soon as it reaches the opening of the tube $p$ it is drawn through the latter into the condenser, the separated air being at the same time exhausted. The passage section of the throttling organs $q$ and $r$ is so restricted that no equalization of pressure worth mentioning through the pipes $o$ and $p$ can take place between the spaces connected. The solution stands at a different level in the chamber $B'$ from that in the chamber $c'$ owing to the fact that the liquid is fed in the evaporating chamber upward by the vapor generated therein by the heating of the liquid. A mixture of this vapor with the heated liquid is formed in the heating tubes $a'$ and is also contained in the chamber $c'$. This mixture of vapor and liquid has a lower specific gravity than the liquid along and by the action of the vapor mixed with the liquid, the mixture is forced or thrown through the pipe $g'$ into the chamber $B'$ and when entering this chamber $B'$, the liquid is separated from the vapor by the mixture striking against the cap $h'$ and the walls of the chamber $B'$. The separated liquid assembles at the bottom of the chamber $B'$ whereas the vapor is conducted away through the pipe $k$. The liquid assembled in the chamber $B'$ therefore has a higher specific gravity than the mixture of vapor and liquid contained in the chamber $c'$, consequently, the liquid in the chamber $B'$ has a tendency to flow down through tube $u$ to the chamber $b'$ whereas the mixture of vapor and liquid or the solution has the tendency to flow upward in tube $g'$, this upward flowing of said mixture in tube $g'$ being assisted by the live force of the vapor mixed with the liquid. The tube $g'$ is of a size sufficient so that the mixture of vapor and liquid passing therethrough can under no circumstances, be throttled to such an extent as to prevent the procedure above described. The liquid contained and assembled in the chamber $B'$ will flow down the tube $u$ when the pressure exerted by this liquid has become sufficient to effect this purpose, in other words, when a fixed quantity of liquid has assembled in said chamber. As the mixture of vapor and liquid by the live force of the vapor is driven upward in the tube $g'$ so only a very small amount of this mixture will be contained in the chamber $c'$ whereas a large quantity of separated liquid may assemble in the chamber $B'$. The reason the liquid rises in the tubes $a'$ but not in tube $u$, is owing to the fact that the tube $u$ is isolated against the action of the heating system by means of an air stratum or the like.

By the arrangement described a continuous passing of the liquid to be evaporated or concentrated through the apparatus is obtained and the insertion and adjustment of special devices controlling the passage of the liquid from the one compartment to the other are dispensed with.

The evaporator may also be operated without vacuum. In such a case the liquid to be evaporated or concentrated is supplied under pressure and the temperature and pressure conditions of the heating steam are correspondingly determined, otherwise the method of operation is exactly the same as in the arrangement described.

Having now described my invention what I claim and desire to secure by Letters Patent of the United States is:

1. In an evaporating apparatus a number of evaporating elements, vertical heating tubes and liquid containers in each of said elements, chambers arranged between said evaporating elements and separate from said liquid containers of said elements for separating the liquid from its vapors generated in said heating tubes, each separating chamber except the last communicating with the liquid container of the following evaporating element, a direct communication between the top part of said separating chamber and the heating space of said following evaporating element, a tube connecting said separating chambers, with the lower part of the liquid container of the same evaporating element, said tube having but very small cross section compared with the total section of all the heating tubes of said evaporating element.

2. In an evaporating apparatus, a number of evaporating elements one above the other, vertical heating tubes and liquid containers in each of said elements, chambers arranged between said evaporating elements and separate from said liquid containers of said elements for separating the liquid from its vapors generated in said heating tubes, each separating chamber except the last communicating with the liquid container of the upper evaporating element, a direct communication between the top part of said separating chamber and the heating space of said upper evaporating element, a tube connecting said separating chambers, with the lower part of the liquid container of the same evaporating element, said tube having very small cross section compared with the total section of all the heating tubes of said evaporating element, tubes depending from the bottom part of the heated liquid container of a higher arranged evaporating element into the lower part of the separating chamber of the lower evaporating element.

3. In an evaporating apparatus, a plurality of evaporating elements, vertical heating tubes and liquid containers in each of said elements, chambers arranged between said evaporating elements and separate from said liquid containers of said elements for separating the liquid from its vapor generated in said heating tubes, each separating chamber except the last communicating with the liquid container of the following evaporating element, the top part of said separating chamber and the heating space of said following vapor element communicating directly with each other, a tube connecting said separating chamber in the last element with the lower part of the liquid container of the same evaporating element, said tube having a small cross sectional area compared with the total section of all the heating tubes of said evaporating element.

4. In an evaporating apparatus, a plurality of evaporating elements disposed one above the other, vertical heating tubes and liquid containers in each of said elements, chambers arranged between said evaporating elements and separate from said liquid containers of said elements for separating the liquid from its vapors generated in said heating tubes, each separating chamber except the last communicating with the liquid container of the upper evaporating element, a direct communication between the top part of said separating chamber and the heating space of said upper evaporating element, a tube connecting said separating chamber in the upper element with the lower part of the liquid container of the same evaporating element, said tube having a small cross section compared with the total section of all the heating tubes of said evaporating elements, tubes depending from the bottom part of the heating liquid container of a higher arranged evaporating element into the lower part of the separating chamber of the lower evaporating element.

5. In an evaporating apparatus the combination of an evaporating compartment and a separating compartment, water chambers arranged above and below the evaporating compartment, a plurality of tubes connecting said water chambers, and a circulation tube connecting the water chamber at the bottom of said evaporating chamber with said separating chamber, said circulating tube being restricted in cross section to produce a limited circulation and a feed pipe opening into the water chamber at the bottom of said evaporating chamber.

6. In an evaporating apparatus, a number of evaporating elements disposed one above the other, vertical heating tubes and liquid containers in each of said elements, chambers arranged between said evaporating elements and separate from said liquid containers of said elements for separating the liquid from its vapors generated in said heating tubes, each separating chamber, except the last, communicating with the liquid containers of the upper evaporating element, a direct communication between the top part of said separating chamber and the heating space of said upper evaporating element, a tube connecting said separating chambers with the lower part of the liquid container of the same evaporating element, said tube being small in the cross section compared with total section of all the heating tubes of said evaporating element, tubes depending from the bottom part of the heated liquid container of a higher evaporating element into a lower part of the separating chamber of the lower evaporating element, and an inlet tube for the liquid to be heated opening from below into the bottom part of the first heated liquid container, the lower end of said tube connecting said separating chambers with the lower part of the liquid container of the same evaporating element lying higher than the upper end of said tube, depending from the same liquid container.

In testimony whereof I have hereunto set my hand in presence of two subscribing witnesses.

WILHELM WIEGAND.

Witnesses:
ALFRED WIEGAND,
RUDOLPH FRICKE.